Jan. 5, 1954  C. E. CHRISTOPHERSEN  2,665,094
AXIALLY TIGHTENING BAND CLAMP
Filed Nov. 4, 1952

INVENTOR.
CLARENCE E. CHRISTOPHERSEN
BY
Lynn W. Latta
—ATTORNEY—

Patented Jan. 5, 1954

2,665,094

UNITED STATES PATENT OFFICE 2,665,094

AXIALLY TIGHTENING BAND CLAMP

Clarence E. Christophersen, Los Angeles, Calif., assignor to Marman Products Company, Inc., Los Angeles, Calif., a corporation of California Application November 4, 1952, Serial No. 318,558

9 Claims. (Cl. 248—27)

This invention relates to band clamps of the type having tightening means including a rotatable actuator element disposed parallel to the axis of the clamp. The invention relates particularly to the type of clamps disclosed in my pending application S. N. 232,430, filed June 19, 1951, for which Letters Patent No. 2,616,644 will issue November 4, 1952. This application is in part a continuation of said pending application.

An object of this invention is to provide a band clamp particularly suitable for mounting an object (such as a measuring or indicating instrument) to a panel (e. g. an instrument panel) and having means which is operable from the front of the instrument panel (while the clamping band itself is located rearwardly of the panel) for tightening the band around the object.

A particular object of the invention is to provide such a clamp which is of maximum simplicity. Specifically, the invention contemplates a clamp comprising simply an anular band having overlapping end portions provided with crossed diagonal cam slots, together with actuator means comprising screw and nut elements, one having a head for end-bearing engagement against the front of the panel (and for transmitting rotating movement from a screw driver or the like) and the other having a projection engaged in the cam slots for camming action to draw the ends of the band together, the axial load set up in the band by the camming action being transmitted directly to the rear face of the panel by the edge of the band, and the panel being clamped directly between the edge of the band and the actuator head. In this connection, the invention aims to eliminate the necessity for the use of a bracket or the like for supporting the screw or for transmitting end thrusts between the screw and the band, the end thrust being transmitted through the panel to which the band is mounted, and the screw being supported simply by its threaded connection with the nut.

In a broader sense, the invention aims to provide a relatively simple axially tightening band clamp utilizing a rotatable screw-actuator mechanism having a follower part which cooperates with crossed diagonal slots in over-lapping end portions of the band, for converting axial movement of the follower part into circumferential tightening movement of the band ends.

A further object is to provide a band clamp for attachment to a panel, embodying an axially disposed screw-actuator which functions not only for tightening the band, but also for attaching the clamp to the panel at one part of attachment, the clamp having one additional attachment device, disposed diametrically opposite the actuator, whereby the clamp may be securely attached to the panel with a minimum of stricture.

Other objects will become apparent in the ensuing specifications and appended drawings in which.

Figure 1:
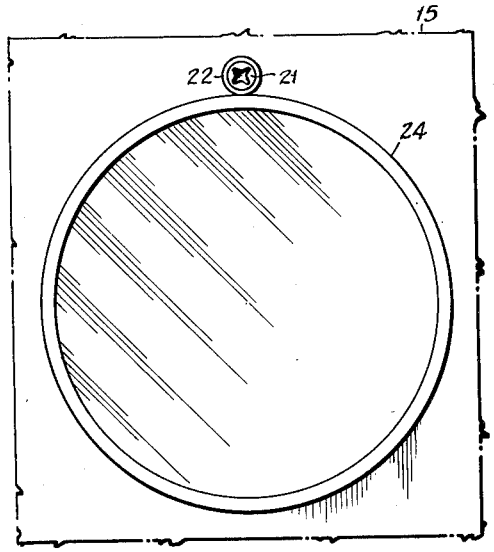
Fig. 1 is a front view of a portion of an instrument panel with an instrument mounted therein by means of my improved mounting clamp.

Referring now to the drawings in detail, my improved band clamp embodies a flexible clamping band 10 of resilient material, preferably metal ribbon. The band 10 has end portions which are offset radially outwardly as at 11, 11' and are thence extended circumferentially to provide overlapping portions 12, 12'. The end portions 11, 11', 12, 12' provide an arch which defines a space 13 lying radially outwardly of the extended inner periphery 14 of the band 10.

Figure 2:
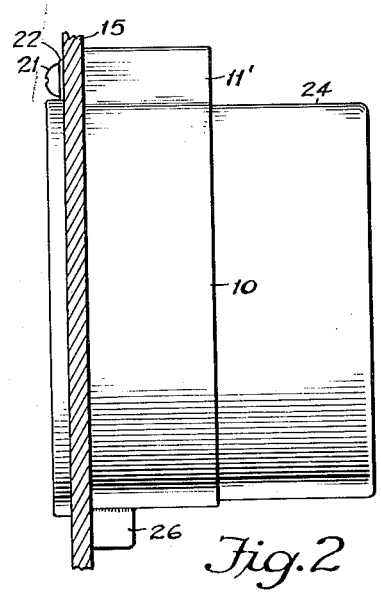
Fig. 2 is a sectional view through the instrument panel showing the clamp and instrument in side elevation.
Figure 3:
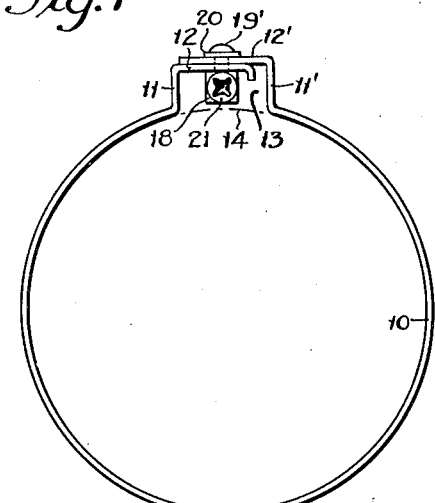
Fig. 3 is a front view of the clamp.
Figure 4:
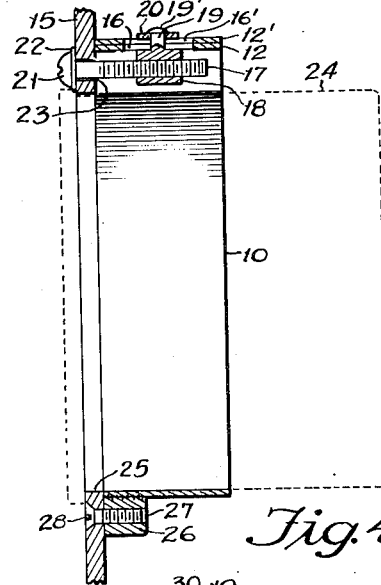
Fig. 4 is an axial sectional view of the clamp and instrument panel assembly.

The band 10 may be shaped to fit the periphery of the instrument or other objects to be mounted therein, and thus may be circular, oval, or polygonal in shape depending upon the particular use for which it is designed. Since in most cases, it will be used for mounting the cylindrical periphery of an instrument or a tube section to a panel (such as the panel 15 shown in Figs. 1, 2 and 4) the band is shown as being cylindrical in peripheral contour.

Figure 5:
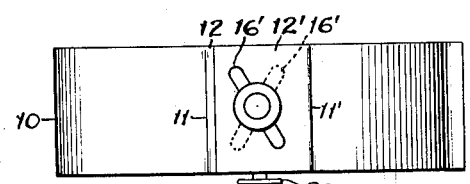
Fig. 5 is a plan view of the clamp.

Overlapping end portions 12, 12' are provided with respective slots 16, 16', extending diagonally at an angle of roughly 30° to the axial plane of the band bisecting the space 13, and is crossed relation to each other as indicated in Fig. 5. An actuator screw 17, disposed with its axis in said axial plane, has a follower nut 18 which is provided with a radially projecting finger 19 passing through the slots 16, 16' where they cross. The outer end of finger 19 is swaged into a head 19' which engages a washer 20 bearing against the outer face of band end member 12'. Actuator screw 17 has a head 21 which is adapted to engage the front side of panel 15, either directly or through a thrust bearing washer 22.

In the installation of the clamp on panel 15, actuator screw 17 extends through an opening 23 in panel 15, and the edge of band 10 bears against the rear face of panel 15. An object 24, which may be an instrument as indicated, or which may be a section of tubing, extends through an opening 25 in the panel 15 and is clamped by the band 10. The band 10 is constricted around the object 24 by rotating actuator screw 17 in the appropriate direction to draw nut 18 toward panel 15, whereupon finger 19 will engage the edges of slots 16, 16' in a manner to exert a camming action against the end portions 12, 12' to draw the ends of the band together. In this operation, the reactive axial load which is developed in screw 17 will be transferred through head 21 and washer 22 to the forward side of panel 15 and the axial load which is transmitted to the band through the engagement of finger 19 against the edges of slots 16, 16' will be transferred to the rear side panel 15 from the edges of the band which are in engagement therewith. As the band is cinched tightly around the object 24, this axial load will increase to the point where the panel 15 is tightly clamped between the head of the screw and the adjacent edge of the band. Thus the actuator screw performs its secondary function of securely attaching the band to the panel 15 at one side of the band.

The band is provided with secondary attaching means comprising an ear or boss 26, positioned diametrically opposite the actuator screw 17 and having a threaded aperture 27 adapted to receive a fastener screw 28 extended through the panel 15. Boss 26 may be a separate part, welded to the outer face of the band 10 as indicated.

The clamp has a self-opening function derived from the resiliency of the band. The band, in its initial, unstressed form (before assembly with the end portions crossed and connected by the camming finger 19) is open and has a diameter larger than that of the assembled clamp, and in the assembling operation the band is stressed so as to bias the end portions for separating movement. Thus, as the actuator screw is rotated in reverse (backed off) the separating movement of the end portions, under the pull of the spring tension in the body portion of the band, will effect a camming movement against the finger 19 to back off the nut 18, allowing the end portions to spread and the band to relax its clamping engagement on the instrument 24.

Figures 6, 7:
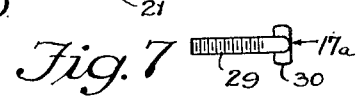
Fig. 6 is a fragmentary axial sectional view of a clamp embodying a modified form of the invention.
Fig. 7 is an inverted plan view of the actuator screw of Fig. 6.

In the form of the invention shown in Fig. 6, an actuator screw 17a includes a threaded shank portion 29 and a finger 19a bent at right angles to shank portion 29. Finger 19a extends through the crossed slots 16, 16' of band ends 12, 12' and terminates in a cross head 30 bridging across the outer slot 16' and bearing against band end portion 12' to hold down the same against band end 12. A nut 18a includes a body portion in the form of a cylindrical, internally threaded sleeve 31 for threaded co-action with threaded shank 29 of the screw 17a, and a head 32 for thrust bearing engagement against the forward side of panel 15, either directly or through an interposed washer 22a. The opening 23a in panel 15 is in this case made sufficiently large in diameter to receive the threaded sleeve 31. The head 32 may be provided with a screw driver slot 33 for actuation of the nut by a screw driver or the like.

In the operation of the modified form of the invention, the screw 17a, instead of the nut, moves axially and the finger portion 19a thereof acts upon the edges of slot 16' to draw the ends of the band together.

For maximum length of the screw, the inner end of nut 31 may extend approximately to the near ends of slots 16, 16', the movement of finger 19a toward the panel 15 being limited in this case by contact with the end of the nut. Where the panel 15 is of substantial thickness (e. g. of the proportions shown in Fig. 6), the nut 18a will be of sufficient length to allow a full range of travel of finger 19a the full length of slots 16, 16' without separation of the nut from the threaded shank 29.

I claim:

1. In an axially operable band clamp for clamping an object to a supporting panel: a band comprising a body portion for encircling said object, circumferentially spaced shoulder portions projecting radially outwardly from the ends of said body portion, and end portions projecting circumferentially from said shoulder portions into overlapping relation, said shoulder and end portions cooperatively providing an arch within which is defined an actuator space disposed radially outwardly of the extended periphery of said body portion; and actuator means comprising a pair of coacting elements one of which is a screw and the other of which is a nut threaded onto said screw, one of said actuator elements having a body portion for rotatable bearing engagement in an opening in said panel and a head for end bearing engagement with the front face of said panel, whereby said one element is axially fixed when operative, the other of said actuator elements being axially movable and having a finger extending radially outwardly therefrom; said band end portions having crossed diagonal slots in which said finger is engaged at the crossing thereof for camming action in response to axial movement of said axially movable actuator element, whereby said band end portions are drawn circumferentially together to tighten said band about said object; said band having, adjacent but axially spaced from said head, an edge constituting the axial extremity of said band, engageable with the rear side of said panel whereby said panel may be clamped between said actuator element head and said band edge, for securing the band against the rear face of the panel.

2. A band clamp as defined in claim 1, wherein said axially fixed actuator element comprises a screw of which said end bearing head is an integral part; and wherein said movable actuator element comprises a follower nut threaded onto said screw and having said camming finger as an integral portion thereof.

3. A clamp as defined in claim 2, including a bearing head at the outer end of said finger, and wherein said band end portions are captive between said follower nut and said bearing head.

4. A clamp as defined in claim 1, wherein said band has, at a point diametrically opposed to said actuator means, a boss attached to and projecting radially outwardly from said body portion, said boss having a threaded hole to receive a fastener screw extended through said panel, and being cooperative with said actuator screw for attaching the band to the panel at diametrically opposed points.

5. In a band clamp for securing an object to the rear side of a mounting panel, and operable from the front of said panel; a band comprising a body portion for encircling the object, circumferentially spaced shoulder portions projecting radially outwardly from the ends of said body portion, and end portions projecting circumferentially from said shoulder portions into overlapping relation, said end portions having crossed diagonal slots and said shoulder and end portions cooperatively providing an arch within which is defined an actuator space disposed radially outwardly of the extended periphery of said body portion; and actuator means comprising a nut having a cylindrical, internally threaded sleeve portion and a head at one end of said sleeve portion, adapted to have end bearing support at the forward face of said panel, with said sleeve portion projecting through an aperture in the panel, and an L-shaped actuator screw including a threaded shank portion threaded into said sleeve and a radially projecting finger extending through said slots at the crossing thereof and engageable with the edges of said slots for camming action in response to axial movement of said screw when said nut is rotated, whereby said band end portions are drawn circumferentially together to tighten said band around said object; said band having an edge constituting an axial extremity thereof engageable with the inner face of said panel whereby said panel is clamped between said band edge and said actuator head as the band is tightened, and said band having, at a point diametrically opposed to said arch, a radially outwardly projecting boss having a tapped opening adapted to receive a fastener screw extended through said panel.

6. In a band clamp for securing an object to the rear side of a mounting panel, and operable from the front side of said panel: a band comprising a body portion for encircling the object, and a pair of end portions in circumferentially overlapping relation, said end portions having crossed diagonal slots; and actuator means comprising a pair of coacting elements one of which is a screw and the other of which is a nut threaded onto said screw, one of said actuator elements having a body portion for rotatable bearing engagement in an opening in said panel and a head for end bearing engagement with the front face of said panel, whereby said one actuator element is axially fixed when operative and the other of said actuator elements is axially movable, said other actuator element having a finger extending through said slots at the crossing thereof and engageable with the edges of said slots for camming action in response to axial movement of said axially movable element, whereby said band end portions are drawn circumferentially together to tighten said band; said band having an edge, constituting an axial extremity thereof, engageable with the inner face of said panel whereby said panel is clamped between said band edge and said actuator head as the band is tightened.

7. In a band clamp for securing an object to the rear side of a panel and operable from the front side of the panel: a band comprising a body portion for encircling the object and a pair of end portions in circumferentially overlapping relation, said end portions having crossed diagonal slots subtending angles of less than 45° to the axial plane of the band which intersects said crossing, with the respective slots diverging from said plane in opposite directions; and coacting actuator elements one of which is a screw and the other of which is a nut threaded onto said screw, one of said actuator elements having a body portion for rotatable bearing engagement in an opening in said panel adjacent the periphery of an opening receiving said object, and having a head for bearing engagement with the front face of said panel, whereby said one element is axially fixed when operative and the other of said elements is axially movable, said other actuator element having a finger extending radially through said slots at the crossing thereof and engageable with the edges of said slots for camming action in response to axial movement of said axially movable element, whereby said band end portions are drawn circumferentially together to tighten said band; said band having an edge constituting an axial extremity thereof, engageable with the inner face of said panel whereby said panel is clamped between said band edge and said actuator head as the band is tightened.

8. A band clamp as defined in claim 7, wherein said fixed actuator element comprises a screw having said end bearing head as an integral part thereof, and wherein said movable actuator element comprises a follower nut threaded onto said screw and having said projection rigidly attached thereto, said projection having a head spaced from said follower nut, said end portions of the band being captive between said projection head and follower nut.

9. A clamp as defined in claim 7, wherein said fixed actuator element comprises a nut having a cylindrical, internally threaded sleeve as said body portion thereof, and having said bearing head as an integral portion thereof at one end; and wherein said movable actuator element comprises an L-shaped element having a threaded shank threaded into said sleeve and having an end portion bent at right angles from said threaded shank and constituting said camming finger, said finger having at its outer end a cross head for bearing against the outer of said band end portions.

CLARENCE E. CHRISTOPHERSEN.

References Cited in the file of this patent

UNITED STATES PATENTS

| Number | Name | Date |
| --- | --- | --- |
| 1,415,914 | Baltzey | May 16, 1922 |
| 2,616,644 | Christophersen | Nov. 4, 1952 |